US009052968B2

(12) United States Patent  (10) Patent No.: US 9,052,968 B2
Beatty, III et al.  (45) Date of Patent: Jun. 9, 2015

(54) METHODS AND SYSTEMS FOR LINKING OBJECTS ACROSS A MIXED COMPUTER ENVIRONMENT

(75) Inventors: Harry J. Beatty, III, Clinton Corners, NY (US); Peter C. Elmendorf, Poughkeepsie, NY (US); Charles Gates, Poughkeepsie, NY (US); Chen Luo, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 13/007,751

(22) Filed: Jan. 17, 2011

(65) Prior Publication Data

US 2012/0185837 A1    Jul. 19, 2012

(51) Int. Cl.
*G06F 9/44* (2006.01)
*G06F 9/445* (2006.01)
*G06F 9/45* (2006.01)

(52) U.S. Cl.
CPC ... *G06F 8/54* (2013.01); *G06F 8/41* (2013.01); *G06F 9/44521* (2013.01)

(58) Field of Classification Search
None
See application file for complete search history.

(56) References Cited

U.S. PATENT DOCUMENTS

| | | | | |
|---|---|---|---|---|
| 4,414,624 A | | 11/1983 | Summer, Jr. et al. | |
| 5,193,191 A | * | 3/1993 | McKeeman et al. | 717/162 |
| 5,307,492 A | | 4/1994 | Benson | |
| 5,437,030 A | * | 7/1995 | Reitman et al. | 717/164 |
| 5,553,286 A | * | 9/1996 | Lee | 717/162 |
| 5,555,411 A | * | 9/1996 | England et al. | 717/162 |
| 5,708,810 A | * | 1/1998 | Kern et al. | 717/162 |
| 5,734,822 A | * | 3/1998 | Houha et al. | 717/167 |
| 5,860,006 A | * | 1/1999 | Osborne et al. | 717/162 |
| 5,923,878 A | * | 7/1999 | Marsland | 717/139 |
| 5,923,884 A | * | 7/1999 | Peyret et al. | 717/167 |
| 6,112,023 A | * | 8/2000 | Dave et al. | 703/27 |
| 6,158,047 A | * | 12/2000 | Le et al. | 717/164 |
| 6,185,733 B1 | * | 2/2001 | Breslau et al. | 717/163 |
| 6,209,020 B1 | | 3/2001 | Angle et al. | |
| 6,374,402 B1 | * | 4/2002 | Schmeidler et al. | 717/167 |
| 6,397,331 B1 | * | 5/2002 | Ober et al. | 713/164 |
| 6,442,752 B1 | * | 8/2002 | Jennings et al. | 717/162 |
| 6,487,577 B1 | * | 11/2002 | Sundararajan | 718/102 |
| 6,560,609 B1 | | 5/2003 | Frey et al. | |
| 6,708,195 B1 | | 3/2004 | Borman et al. | |
| 6,711,616 B1 | | 3/2004 | Stamm et al. | |
| 6,748,459 B1 | * | 6/2004 | Lin et al. | 710/3 |
| 6,901,588 B1 | * | 5/2005 | Krapf et al. | 717/164 |
| 6,915,511 B2 | * | 7/2005 | Susarla et al. | 717/164 |

(Continued)

OTHER PUBLICATIONS

"Sourcery G++ Lite ARM EABI Sourcery G++ Lite 2010q1-188 Getting Started", CodeSourcery, 2009, <https://web.eecs.umich.edu/~prabal/teaching/eecs373-f10/readings/CodeSourcery_Getting_Started_Guide.pdf>, pp. 1-91.*

(Continued)

*Primary Examiner* — Thuy Dao
*Assistant Examiner* — Samuel Hayim
(74) *Attorney, Agent, or Firm* — Cantor Colburn LLP; William Steinberg

(57) ABSTRACT

A method of linking a computer program across a mixed computing environment is provided. The method includes, performing on one or more processors: identifying signatures of elements of the computer program; loading a plurality of modules of the computer program; and linking the plurality of modules using the signatures of the elements.

16 Claims, 10 Drawing Sheets

(56) References Cited

U.S. PATENT DOCUMENTS

| | | | |
|---|---|---|---|
| 6,975,595 B2 | 12/2005 | Peterson | |
| 7,031,887 B2 | 4/2006 | Jain et al. | |
| 7,073,170 B2* | 7/2006 | Grier et al. | 717/167 |
| 7,174,544 B2* | 2/2007 | Zee | 717/148 |
| 7,281,247 B2* | 10/2007 | Lodwick et al. | 717/176 |
| 7,321,958 B2* | 1/2008 | Hofstee et al. | 711/153 |
| 7,401,219 B2* | 7/2008 | Aho et al. | 713/167 |
| 7,415,703 B2* | 8/2008 | Aguilar et al. | 717/166 |
| 7,519,800 B2* | 4/2009 | Michaelis | 713/1 |
| 7,533,389 B2* | 5/2009 | Verbeke et al. | 717/167 |
| 7,574,438 B2 | 8/2009 | Cina | |
| 7,584,239 B1 | 9/2009 | Yan et al. | |
| 7,689,783 B2* | 3/2010 | Hofstee et al. | 711/153 |
| 7,689,784 B2* | 3/2010 | Suzuoki | 711/154 |
| 2001/0047512 A1* | 11/2001 | Szewerenko et al. | 717/10 |
| 2002/0144248 A1* | 10/2002 | Forbes et al. | 717/167 |
| 2002/0170047 A1* | 11/2002 | Swetland | 717/162 |
| 2003/0088865 A1* | 5/2003 | Lim et al. | 717/167 |
| 2003/0135621 A1* | 7/2003 | Romagnoli | 709/226 |
| 2004/0019890 A1 | 1/2004 | Verbeke et al. | |
| 2004/0215522 A1 | 10/2004 | Eder | |
| 2004/0268345 A1* | 12/2004 | Lodwick et al. | 717/176 |
| 2005/0081181 A1* | 4/2005 | Brokenshire et al. | 717/100 |
| 2006/0037011 A1* | 2/2006 | Shi et al. | 717/164 |
| 2006/0069713 A1 | 3/2006 | Wei et al. | |
| 2006/0095898 A1* | 5/2006 | Chow et al. | 717/140 |
| 2006/0130065 A1 | 6/2006 | Chin et al. | |
| 2006/0168571 A1* | 7/2006 | Ghiasi et al. | 717/127 |
| 2007/0011494 A1* | 1/2007 | Xie et al. | 714/38 |
| 2007/0033592 A1* | 2/2007 | Roediger et al. | 718/102 |
| 2007/0220517 A1 | 9/2007 | Lippett | |
| 2007/0283358 A1* | 12/2007 | Kasahara et al. | 718/104 |
| 2008/0244599 A1* | 10/2008 | Hodson et al. | 718/104 |
| 2008/0313640 A1* | 12/2008 | Liu et al. | 718/104 |
| 2009/0070750 A9* | 3/2009 | Gu | 717/140 |
| 2009/0164995 A1 | 6/2009 | Waris | |
| 2009/0228892 A1 | 9/2009 | Di Luoffo et al. | |
| 2010/0100941 A1 | 4/2010 | Eom et al. | |
| 2010/0299499 A1* | 11/2010 | Golla et al. | 712/206 |
| 2010/0302944 A1* | 12/2010 | Bessis et al. | 370/235 |
| 2010/0318693 A1 | 12/2010 | Espig et al. | |
| 2012/0180054 A1* | 7/2012 | Beatty et al. | 718/102 |
| 2012/0185677 A1* | 7/2012 | Beatty et al. | 712/220 |
| 2012/0185828 A1* | 7/2012 | Beatty et al. | 717/124 |
| 2013/0086338 A1* | 4/2013 | Blainey et al. | 711/156 |
| 2013/0086570 A1* | 4/2013 | Blainey et al. | 717/165 |

OTHER PUBLICATIONS

Herman Chung-Hwa Rao, "Distributed Application Framework for Large Scale Distributed System", IEEE, 1993, <http://ieeexplore.ieee.org/stamp/stamp.jsp?tp=&arnumber=287726>, pp. 31-38.*

Larry Peterson et al., "Distributed Shared Library", ACM, 1992, <http://delivery.acm.org/10.1145/510000/506412/p33-peterson.pdf>, pp. 1-5.*

"distcc: a fast, free distributed C/C++ compiler", Distcc, Dec. 2004, <https://code.google.com/p/distcc/>, pp. 1-2.*

Harold Carr et al., "Compiling Distributed C++", IEEE, 1993, <http://ieeexplore.ieee.org/stamp/stamp.jsp?tp=&arnumber=395492>, pp. 1-8.*

Peter Fritzson, "Preliminary Experience from the DICE system a Distributed Incremantal Compiling Environment", ACM, 1984, <http://delivery.acm.org/10.1145/810000/808256/p113-fritzson.pdf>, pp. 1-11.*

Anthony Chronopoulous, "A Class of Parallel Iterative Methods Implemented on Multiprocessors", Dept. of Computer Science, University of IL, Nov. 1986.

International Search Report for PCT Application No. PCT/US2012/020256 filed Jan. 5, 2012; Applicant: International Business Machines Cirporation, 4 pgs.

Khalifa et al., "Dynamic On-Line Allocation of Independent Task onto Heterogeneous Computing Systems to Maximize Load Balancing", 978-1-4244-3555-5/08 IEEE 2008.

Mark Edward Segal et al., "Dynamic Program Updating in a Distributed Computer System", IP.com, IPCOM00128761D, 1989.

* cited by examiner

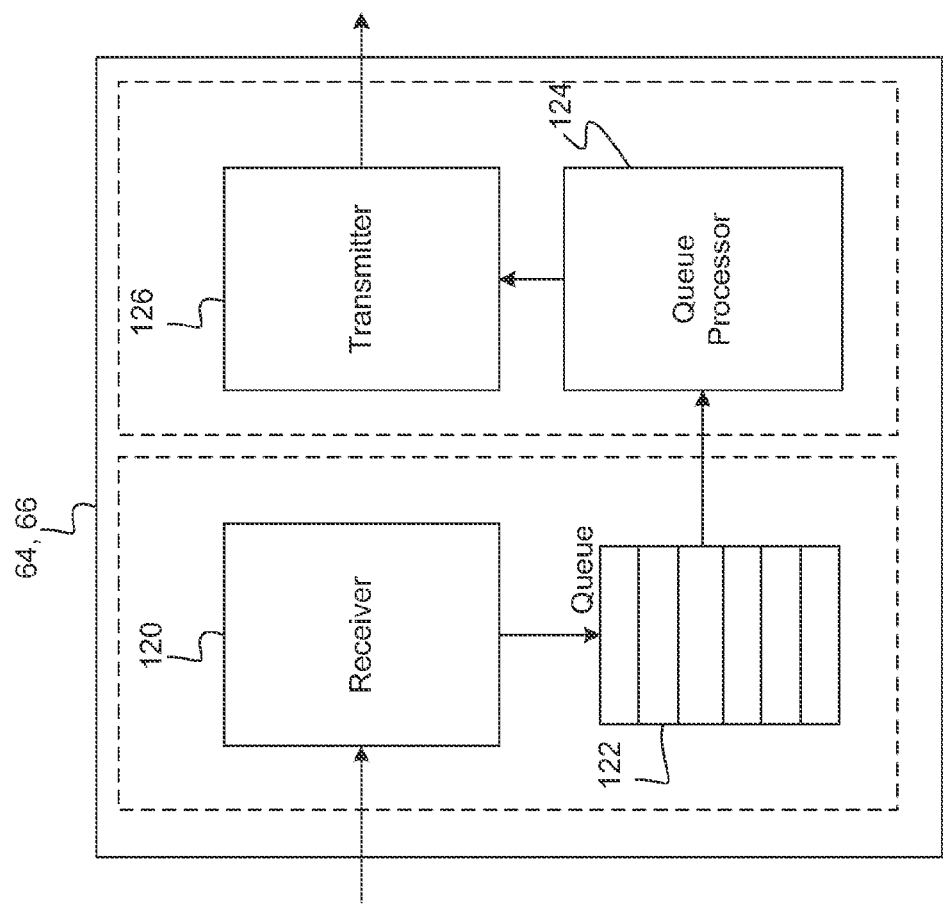

| | Command | Contents | Acknowledgement |
|---|---|---|---|
| 130 | Load Module | Distant program ID, url, path, module name | Linker processing level Processor index |
| 132 | Add Module | Distant program ID, url, path, module name | Linker processing level Processor index |
| 134 | Unload Module | Distant program ID, url, path, module name | Linker processing level |
| 136 | Load Error | Distant program ID | Accept/reject |
| 138 | Create Distant Context | Distant program ID, Url, context ID | Context ID |
| 140 | Program End | Distant program ID | Accept |
| 142 | Begin | Begin operations with the definitions at the current linker level | Accept/reject |
| 144 | BCT Proposals | Distant program ID, BCT definition list | Accept/reject |
| 146 | BCT Definitions | Distant program ID, BCT definition list, Linker processing level | Accept/reject |
| 148 | Disclose Function Proposals | Distant program ID, disclose name list | Accept/reject |
| 150 | Exterior Function Proposals | Distant program ID, exterior name list | Accept/reject |
| 152 | Disclose Function Definitions | Distant program ID, disclose function definitions | Accept/reject |
| 154 | Exterior Function Definitions | Distant program ID, exterior function definitions | |

FIG. 7

Environment Universe Address Map

| Message ID | Message Type | Distant Universe | Context ID | Linker Message |
|---|---|---|---|---|
| 204 | New Distant Universe | 206 | 208 | |
| 208 | Kill Universe | Universe ID | Context ID | |
| 214 | Link Message | Universe ID | Context ID | Linker or Delegation Message |
| 216 | New Local Universe | | | Named Socket |
| 218 | New Context | Universe ID | Context ID | |
| 220 | Delegation | Universe ID | Context ID | Delegation Packet |
| 222 | Unload Context | Universe ID | Context ID | |

FIG. 11

METHODS AND SYSTEMS FOR LINKING OBJECTS ACROSS A MIXED COMPUTER ENVIRONMENT

BACKGROUND

The present invention relates to systems, method and computer program products for linking work in a computer environment.

Parallel programming is a form of parallelization of computer code across multiple processors in parallel computing environments. Task parallelism distributes execution processes (threads) across parallel computing nodes.

In order to write a parallel program, programmers should understand how to use mutex locks, how to avoid dead lock situations, when to instruct the compiler not to optimize because it might jeopardize the parallel integrity of the system, and should make sure there is no concurrency around critical data. Simplifying parallelization of a program requires removing many of these difficult error prone steps.

SUMMARY

According to one embodiment, a method of linking a computer program across a mixed computing environment is provided. The method includes, performing on one or more processors: identifying signatures of elements of the computer program; loading a plurality of modules of the computer program; and linking the plurality of modules using the signatures of the elements.

According to another embodiment, a computer program product for linking a computer program across a mixed computing environment is provided. The computer program product includes a tangible storage medium readable by a processing circuit and storing instructions for execution by the processing circuit for performing a method. The method includes: identifying signatures of elements of the computer program; loading a plurality of modules of the computer program; and linking the plurality of modules using the signatures of the elements.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 6 is a block diagram illustrating a local linker and a distant linker of the linking system in accordance with exemplary embodiments;

FIG. 7 is table listing commands of the linking system in accordance with exemplary embodiments;

FIGS. 9 through 11 are tables illustrating data storage maps of the linking system in accordance with exemplary embodiments.

DETAILED DESCRIPTION

Figure 1:
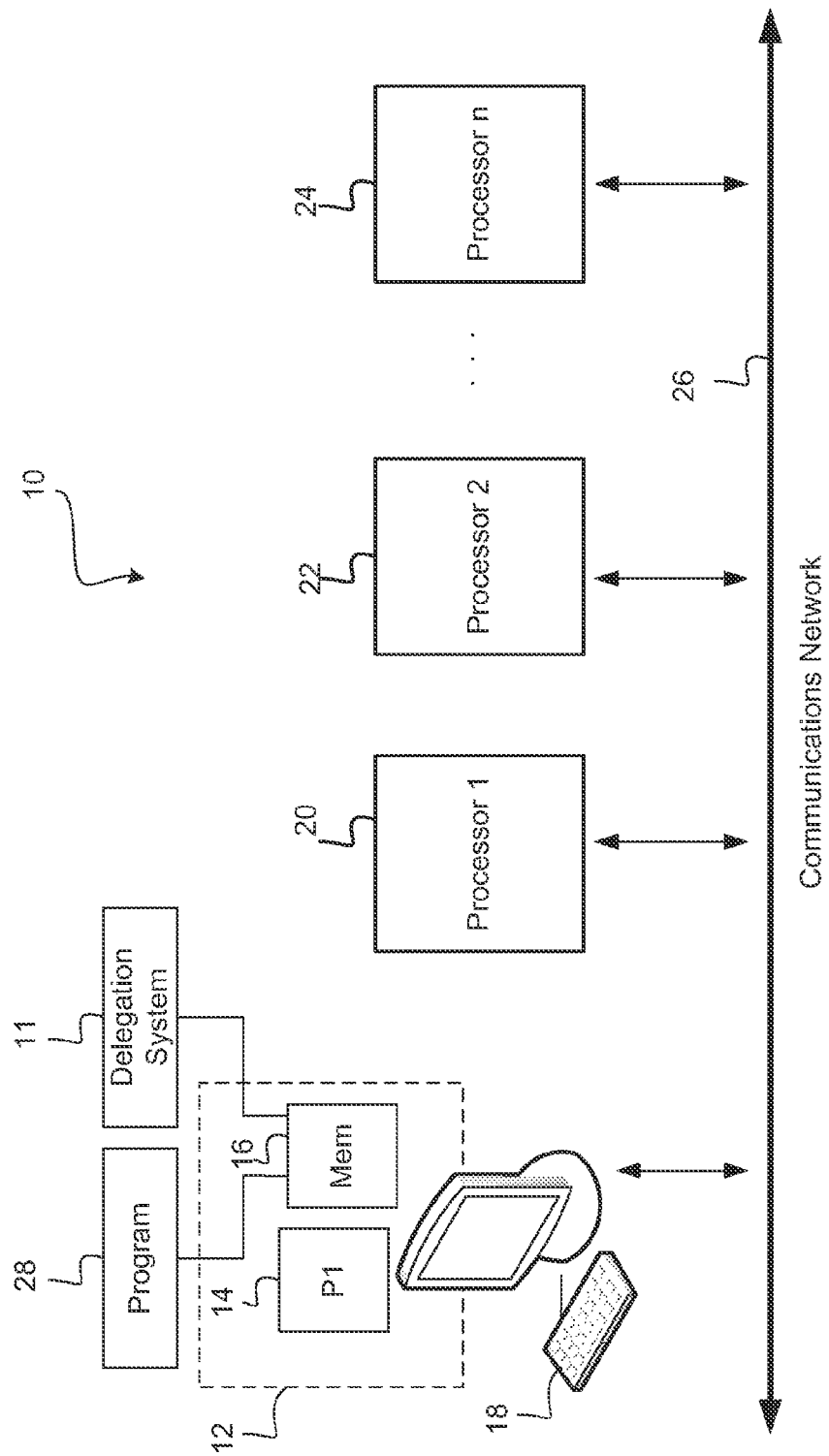
FIG. 1 is a block diagram illustrating a computing system that includes a linking system in accordance with exemplary embodiments.

The following description is merely exemplary in nature and is not intended to limit the present disclosure, application, or uses. It should be understood that throughout the drawings, corresponding reference numerals indicate like or corresponding parts and features.

As used herein, a binary coded type (BCT) refers to a string of bytes that represent a signature of elements of a computer program. Such elements can include, but are not limited to, data types, their attributes and their order in data structures, data objects, and function arguments and results. The BCTs can be generated, for example, by a compiler at compile time. For example, the BCTs can be static compile time constants.

In various embodiments, the BCTs are generated based on a unique naming convention using unique integers. For example, base types that are supported by the computer hardware, such as double precision or single precision floating point numbers, integers, bytes, or pointers are identified and assigned a single byte. Within that byte there can be a reserved bit that identifies whether the value represented by the type can be modified or is a constant. For example, a constant double precision floating point type is represented by 0x05, and one that can be modified is represented by 0x45.

Similar reasoning applies to the other base types. For aggregate types there are more attributes that can be set such as the structure or array can be modified, access to the aggregate should be serialized, or for memory management purposes the reference count manipulation should be serialized. These attributes vary depending on the language, but in any case these attributes are recognized as additional bits on the type byte. Negative values can similarly be used to represent universally predefined structure layouts.

An example BCT is as follows:

```
Static unsigned char dcm__3BCT__7[ ] = {
    0x80, 0x00                    /* Escape, BCT Length Op */
    0x00, 0x00, 0x00, 0x05        /*Length of following BCT*/
    0x02, 0x02, 0x02,             /* Three Strings 8*/
    0x04, 0x04                    /* Two Voids*/
};
```

The BCT includes an escape code, a length, and a data section. The escape code is used in BCTs for linking since the BCTs are standalone items. Note that the escape code consists of two bytes: 0x80 to indicate an escape op, and the following byte to indicate what kind of escape op. 0x00 indicates a BCT length indicator. The next bytes (e.g., four bytes) contain the length (in bytes) of the BCT data that follows. In various embodiments, this length is in memory-image order. For example, the bytes can be memcpy'd to a work area and then fetched as an integer.

Consider the example with a BCT length indicator of 5, on an IBM PowerPC machine and an Intel x86 machine. This BCT is for the RESULT of EXAMPLE_TYPE, which contains three STRINGs and two VOIDs. Strings are pointers to a null terminated character array; and a VOID is an address to an area with no defined type. In this example, the integer length field is in memory image order. All BCT fields that are not single bytes are presented in memory image order for the machine on which they are compiled. These fields are unaligned, and typically have to be copied (as bytes) to an aligned variable in order to be properly accessed. In various embodiments, to attain maximum compaction, the data in the BCT is misaligned. In various embodiments, the individual field description code and the escape code 0x8000 are not byte-swapped in the x86 example, because these codes are defined as single bytes. (The escape operator 0x80 takes the next byte as a separate subcode: it is two byte values, not a single short int value.)

With reference now to the Figures where various exemplary embodiments will be described without limiting the same in FIG. 1, a computer system is shown generally at 10 that includes a linking system 11 in accordance with various embodiments. The computer system 10 includes a first machine 12 that includes a first processor 14 that communicates with computer components such as memory devices 16 and peripheral devices 18. The computer system 10 further includes one or more other processors 20-24 that can similarly communicate with computer components 16, 18, or other components (not shown) and with the other processors 14, 20-24. In various embodiments, the one or more other processors 20-24 can be physically located in the same machine 12 as the first processor 14 or can be located in one or more other machines (not shown).

Each of the processors 14, 20-24 communicates over a network 26. The network 26 can be a single network or multiple networks and can be internal, external, or a combination of internal and external to the machine 12, depending on the location of the processors 14, 20-24.

In various embodiments, each processor 14, 20-24 can include of one or more central processors (not shown). Each of these central processors can include one or more subprocessors. The configuration of these central processors can vary. Some may be a collection of stand alone processors attached to memory and other devices. Other configurations may include one or more processors that control the activities of many other processors. Some processors may communicate through dedicated networks or memory where the controlling processor(s) gather the necessary information from disk and other more global networks to feed the smaller internal processors.

In the examples provided hereinafter, the computing machines 12 and processors 14, 20-24 will commonly be referred to as nodes. As disclosed herein, the nodes perform portions of a computer program 28 using the linking system 11.

Figure 2:
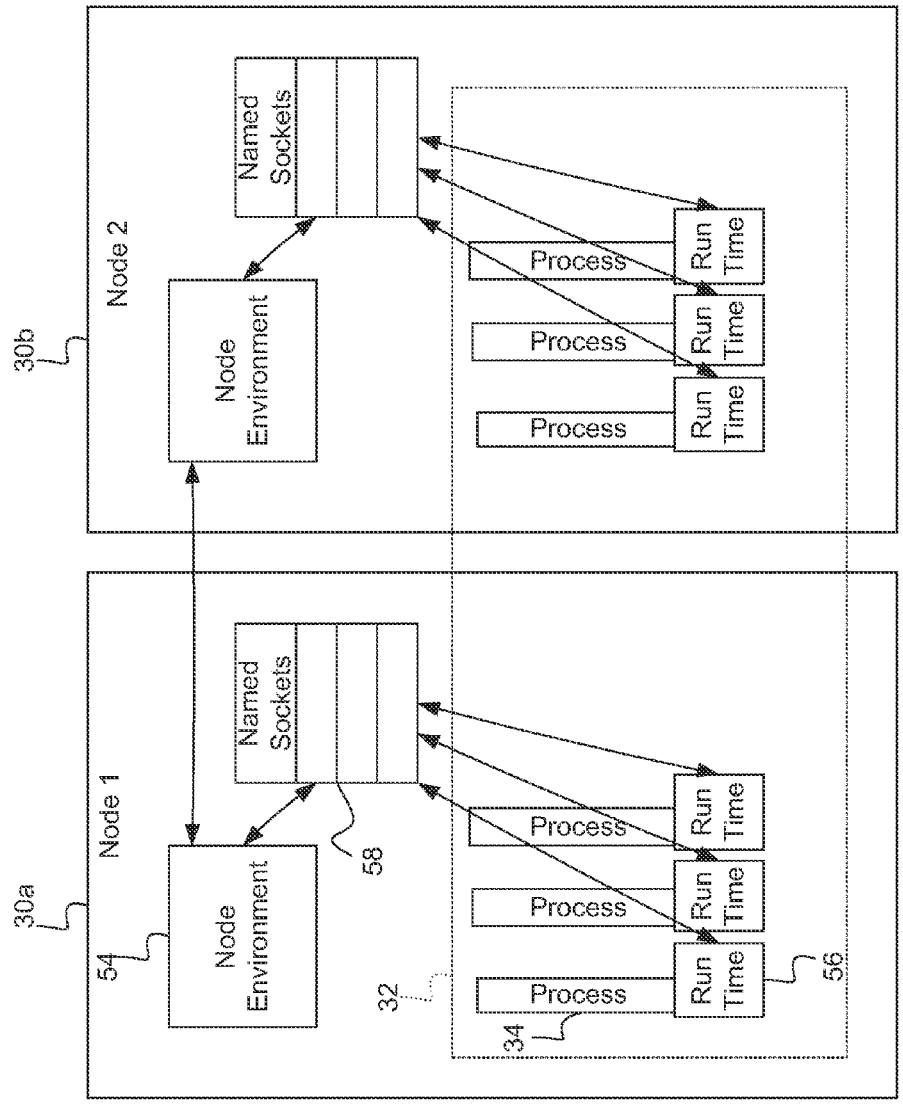
FIGS. 2 through 4 are block diagrams illustrating the computing system of FIG. 1 in more detail in accordance with exemplary embodiments.
Figure 3:
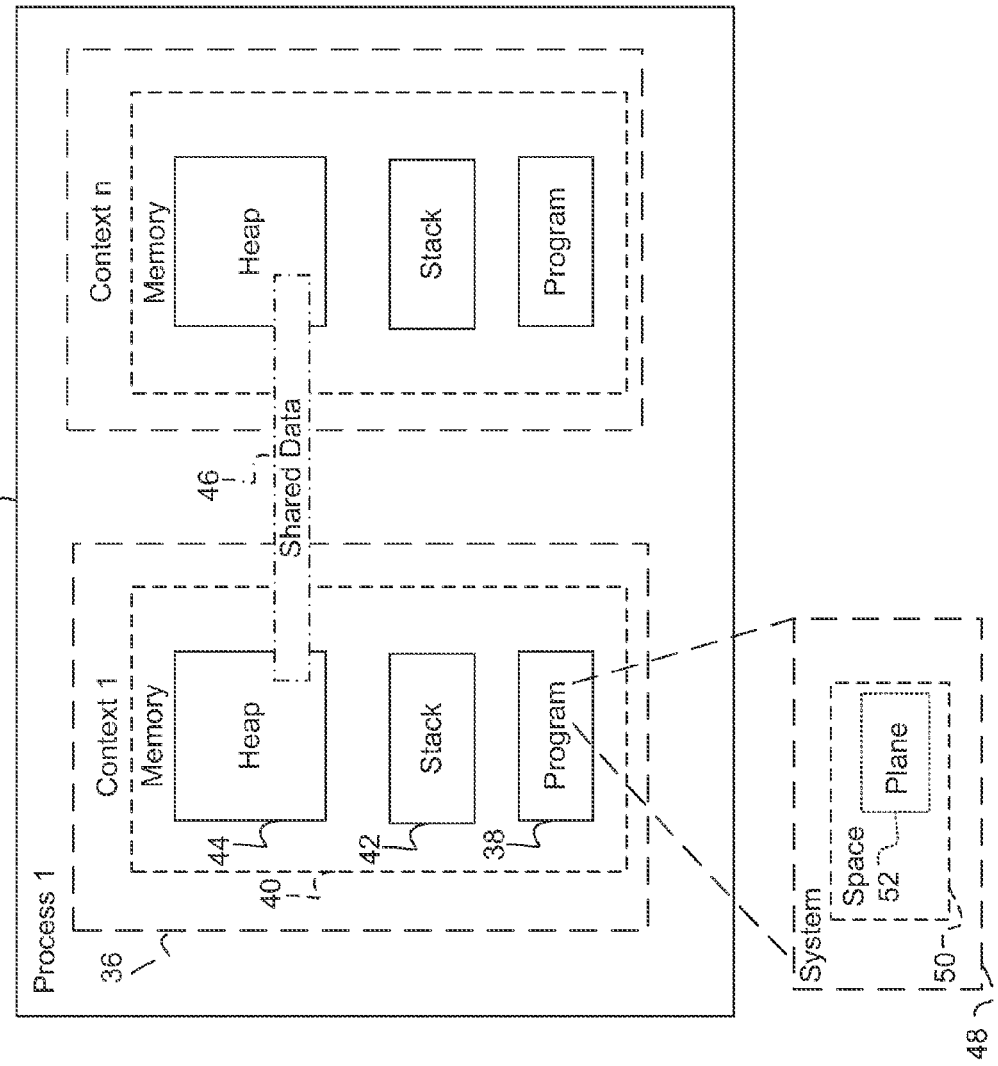

With reference now to FIGS. 2 and 3, the exemplary embodiments discussed hereinafter will be discussed in the context of two nodes 30a and 30b. As can be appreciated, the linking system 11 of the present disclosure is applicable to any number nodes and is not limited to the present examples. As discussed above, the nodes 30a and 30b are implemented according to different architectures. The nodes perform portions of the computer program 28 (FIG. 1). A single instantiation of a computer program 28 is referred to as a universe 32. The universe 32 is made up of processes 34.

As shown in FIG. 3, each process 34 operates as a hierarchy of nested contexts 36. Each context 36 is program logic 38 of the computer program 28 (FIG. 1) (or universe 32 (FIG. 2)) that operates on a separate memory image. Each context 36 can be associated with private memory 40, a stack 42, and a heap 44. The context 36 may have shared data 46 for global variables and certain program logic 38.

The program logic 38 of each context 36 can be composed of systems 48, spaces 50, and planes 52. For example, the universe 32 (FIG. 2) is the root of the hierarchy and within the universe 32 (FIG. 2) there can be one or more systems 48. The system 48 can be a process 34 that includes one or more spaces 50 and/or planes 52. A space 50 is a separate and distinct stream of executable instructions. A space 50 can include one or more planes 52. Each plane 52 within a space 50 uses the same executable instruction stream, each in a separate thread. For ease of the discussion, the program logic of each context 36 is commonly referred to as a module regardless of the system, space, and plane relationship.

With reference back to FIG. 2, to enable the execution of the universe 32 across the nodes 30a, 30b, each node 30a, 30b includes a node environment 54. The node environment 54, handles the linking and operational communications being passed between the nodes 30a, 30b (as will be discussed in more detail below). In various embodiments, the node environment 54 communicates with other node environments using for example, network sockets (not shown).

To further enable the execution of the universe 32 across the nodes 30a, 30b, and within the nodes 30a, 30b, each process 34 may include or be associated with a collection of support routines called a run-time environment 56 (as will be discussed in more detail below). In various embodiments, the node environment 54 communicates with the run-time environment 56 using named sockets 58. As can be appreciated, other forms of communication means may be used to communicate between systems such as, for example, shared memory.

With reference now to FIGS. 4-11, portions of the run-time environment 56 and the node environment 54 will be described in accordance with various embodiments. In particular, the linking system 11 provided by the run-time environment 56 and the node environment 54 will be described in accordance with exemplary embodiments.

Figure 4:
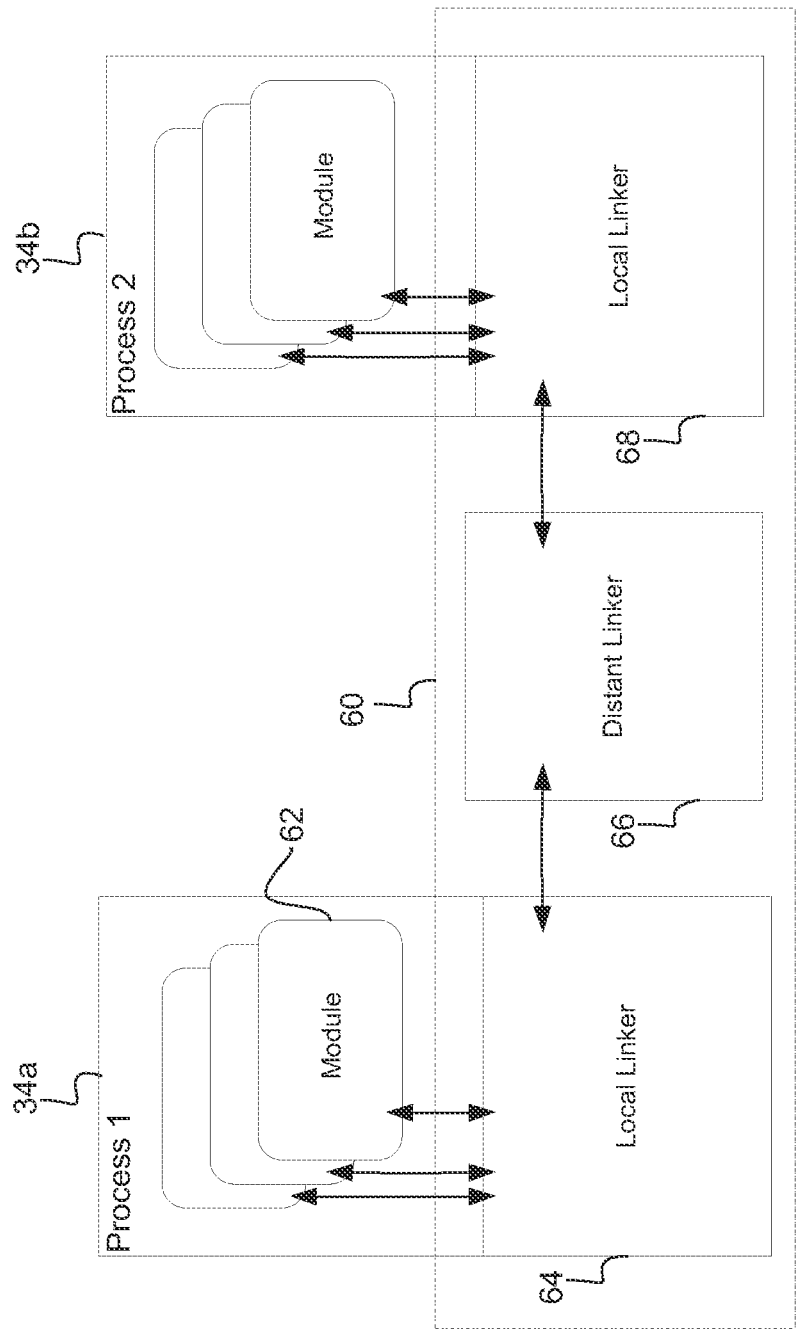

FIG. 4 illustrates the linking system 11 of the run-time environment 56 with regard to two processes 34a, 34b. As can be appreciated, the run-time environment 56 is applicable to any number of processes and is not limited to the present example. In various embodiments, the linking system 11 includes a linker 60. As can be appreciated, the linker 60 manages the loading and linking of modules 62 of the same process 34a, modules 62 of different processes 34a, 34b on the node, modules of different processes on different nodes, and modules of different nodes with different architectures, where, as discussed above, a module 62 is a collection of program logic or executable instructions of the computer program 28 (FIG. 1). In general, the linker 60 manages the linking by communicating the architectural differences and address differences between the modules 62.

In various embodiments, the linker 60 includes a local linker 64 that communicates with a remote local linker 68 through a distant linker 66. The local linker 64 and the distant linker 66 can be, for example, a separate process started by the loading of a first module of a first process 34a, a daemon for this purpose that is continually running, or a thread of the first process 34a started. In any of the embodiments, the distant linker 66 responds to asynchronous events produced by the modules 62 running asynchronously.

Figure 5:
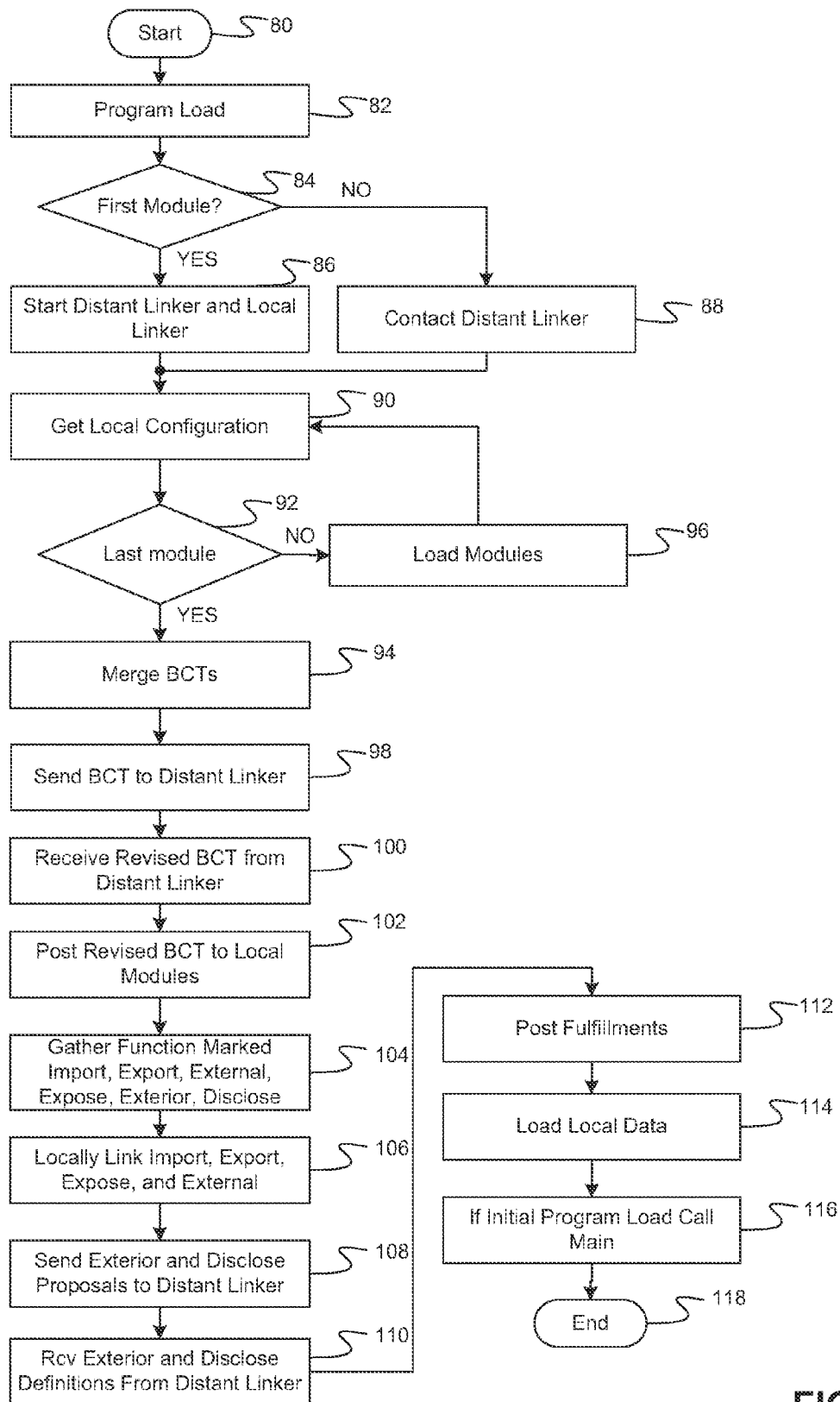
FIG. 5 is a flowchart illustrating a linking method that is performed by the computing system of FIG. 1 in accordance with exemplary embodiments.

In various embodiments, the local linker 64 and the distant linker 66 perform the loading and linking by a method, for example, as shown in the flowchart of FIG. 5. With reference to FIG. 5 and with continued reference to FIG. 4, the method may begin at 80. The functions of the local linker 64 begin when a first module 62 of the computer program 28 (FIG. 1) is loaded at 82. The first module 62 typically is the module in the computer program 28 (FIG. 1) that contains the main routine. The module 62 with the main routine is dynamically or statically linked to run-time functions of the local linker 64.

When the first or main module is loaded at 84 the local linker 64 and the distant linker 66 are started at 86. Otherwise, the distant linker 66 is contacted at 88. The local linker 64 then identifies and loads any additional modules 62. For example, the local linker 64 accesses each module 62 to be loaded and obtains the module's configuration information at 90. The data in the configuration contains the list of additional modules 62 that need to be loaded, the data format definitions in the form of BCTs, the list of functions and variables that transcend the boundary of the current module being linked, and any local files that need to be loaded. The configuration information can be transferred from the module 62 to the local linker 64 via a function call in the loaded module 62.

As the various modules are loaded and the data is collected, at 90, 92, 96, the data is merged into one common area for the run-time's processing. If the module 62 to be loaded is not a module intended for the current process 34*a* (for example), a message is sent to the distant linker 66. The distant linker 66 may attempt to load these modules and check for duplicates.

After the data is gathered, the local BCTs of the modules are merged into a single consistent set of definitions with no redundancies at 94. The local BCTs are assembled and transmitted to the distant linker 66 at 98. When the distant linker 66 receives these definitions, it assembles the BCTs into a single set of consistent BCTs, with no duplicates.

The local linker 64 waits for the distant linker 66 to transmit the revised set of BCTs at 100. The BCTs returned by the distant linker 66 will most likely have different definition numbers and definition sequences. The local linker 64 places the revised BCT definition in each loaded module 62 at 102. This process enables all the modules 62 to have access to the same definitions for all the data types used. In various embodiments, all the modules 62 in the same process 34*a* can have access to the same definition table to save memory. This may be accomplished via pointers to points so that the pointer in the modules 62 can be updated while the program runs.

The local linker 64 then gathers external symbols from all the loaded modules at 104. The external symbols can include the functions and variables that either use other modules 62 to satisfy or supply embodiments for other modules 62 to use. The external symbols can be, for example, an import type, an export type, an expose type, an external type, an exterior type, or a disclose type.

An import type is a function prototype in one module that will be satisfied by another module in the same space. There can be many imports in a given space, typically one per module. An export type is a function embodiment that is linked to other import prototypes in other modules in the same space. Since they are in the same space they can use linking similar to that of C extern. There can only be one export of a given name in a space.

An external type is a function prototype that can be satisfied by expose functions in other spaces. There can be many external statements, typically up to one per module. An expose type is a function embodiment that is called by other external functions in other spaces. There is one expose per space. Since there can be many spaces there can be many exposes of the same name in a program. The linking between these functions is done by function pointer/name pair and kept in a table that identifies which actual function is associated with each space. The program can use program variables to dynamically select which expose it wishes to reference. These variables are associated with space context An exterior type is a function prototype that is satisfied by a disclose statements in other systems. There can be many exterior functions, typically up to one per module. A disclose type is a function embodiment that is called by an exterior statement. There can be only one disclose statement per system. Since there are possibly many systems in a universe there can be many disclose statements in the universe. The programmer can use program variables to select the appropriate disclose to call. Since the disclose and exterior statements can exist on different nodes and even on different architectures they are linked using a unique identifier.

After the external symbols have been collected, the local linker 64 links the modules 62 together that are of the same process 34*a* at 106. The local linking is based on those symbols of external type, expose type, import type, and export type using the updated BCTs that were received from the distant linker 66. After the local linker 64 processes the external symbols local to the current process, the local linker 64 transmits to the distant linker 66 the list of exterior type and disclose type symbols at 108. The distant linker 66 matches up the exterior type and disclose type symbols to ensure that they are consistent. The local linker 64 then waits for the distant linker 66 to send back the list of exterior type and disclose type symbols at 110. Once having received the exterior type and disclose type symbol updates from the distant linker 66, the local linker 64 posts the revised definitions back into the loaded modules at 112. After the revised definitions have been posted, the local linker 64 loads any local files identified at 114. If the local linker 64 has determined that it was the initial module system loaded, it will call an expose type function called "MAIN" to start the program at 116.

The local linker 64 determines whether the module was the first module loaded by the routine called. The compiler will recognize the fact that the module contains a "MAIN" and sets up the hidden entry point accordingly. When compiling the module the compiler determines this module is not a main program and the compiler will set the run-time to start at 88 bypassing the initial program load and starting the distant linker 66. In various embodiments, the linking system 11 can start multiple modules each having a main routine provided there is only one per process 34*a*.

With reference now to FIG. 6, the architecture of the local linker 64 and the distant linker 66 is described in more detail. The local linker 64 can be, for example, a delegation based systems that include a receiver 120 a queue 122, and a transmitter 126, where the receiver 122 receives link commands and then places these commands on the delegation queue 122. An associated processor 124 then processes each command in the order they were placed in the queue 122.

The distant linker 66 similarly can be a delegation based system that includes a receiver 120 and a queue 122, where the receiver 120 receives link commands from the local linkers and then places these commands on a distant linker delegation queue 122. The receiver can be operated as a separate receiver thread to make its asynchronous nature easier to deal with. The queue 122 can be a locked object such that access to the queue is serialized. For example, only one may have access at a time. In this case, either the communications receiver 120 or the queue processor 124 but not both can operate on the queue 122 at any instance in time.

The queue processor 124 removes commands from the queue 122 one at a time and operates on the commands according to their type. When the queue processor 124 finishes processing the commands the result is sent to the transmitter 126. The transmitter 126 sends the results processed by the queue processor 124. The transmitter 126 is responsible for routing the messages to the associated local linker 64. The transmitter 126 can be implemented as either a separate thread or as a serial set of routines called by the queue processor 124.

To facilitate the communication between the distant linker 66 and the local linkers 64, a common set of commands can be established. As shown in FIG. 7, exemplary commands can include, but are not limited to, a load module command 130, an add module command 132, an unload module command 134, a load error command 136, a create distant context command 138, a program end command 140, a begin command 142, a BCT proposals command 144, a BCT definitions command 146, a disclose function proposals command 148, an exterior function proposals command 150, a disclose function definitions command 152, and an exterior function definitions command 154.

The load module command 130 is used when the modules being loaded have identified dependencies on other modules located on distant nodes. This command originates on a local linker 64 and is sent to the distant linker 66. The distant linker 66 propagates the load module command 130 to either the associated daemon to begin loading of the identified module.

The add module command 132 is used to identify a module that needs to be added during program execution. The context that makes the request waits on the associated loading and linking of the identified modules that the identified module is dependent on. The add module command 132 is generated by the local linker 64 and is propagated to the appropriate daemon by the distant linker 66.

The unload module command 134 initiates the removal of the identified module and any dependent modules the identified module may have loaded. This command is generated by the local linker 64 and the distant linker 66 routes the command to the affected remote local linker 68. In various embodiments, the unload module command 134 is optional and the modules may be added but not removed. The reason for this is that the module calling for the removal of the module could cause dependencies to fail for other modules.

The load error command 136 signals that an error has occurred and that the system should terminate. This command is generated by the local linker 64 and is propagated to all the other remote local linkers 64 by the distant linker 66. In the process of terminating the local linkers 64, the local linkers 64 unload all modules and return any used memory back to the system. The local linker 64 for the initial program load typically issues an error message indicating the problem. The local linker 64 that encountered the error has the responsibility for generating the error description.

The create distant context command 138 causes the local linkers 64 to create a new delegation queue system for the new context on all the participating processors. The distant linker 66 gives the new context a context identification and propagates the message to all the participating local linkers 64. The originating linker returns the new context identification to the initiating routine.

The program end command 140 causes the node to terminate program activity. The program end command 140 has an argument that identifies whether the termination is abrupt or graceful. The abrupt option causes the local linkers 64 to stop all activity immediately. The graceful option causes the local linker 64 and the distant linker 66 to stop operations by placing the terminating command in the queues 122. The terminating command is a hidden function generated by the compiler that forces that context to dismantle itself when this instruction is processed. The program end command graceful option can be followed by the program end abrupt option.

Each local linker 64 that completes the graceful work issues the program end abrupt to the distant linker 66. The distant linker 66 propagates the command to all local linkers 64 after it receives the command program end abrupt option from each local linker 64. The local linkers 64 do not terminate their associated modules until the program end abrupt is received from the distant linker 66.

The begin command 142 causes the local linkers 64 to release their context to do work with the definitions that have currently been processed. The begin command 142 is issued by the distant linker 66.

The BCT proposals command 144 contains a list of BCTs that have had redundancies removed and has been sorted by the local linker 64 and is sent to the distant linker 66. The distant linker 66 collects all the BCTs from the local linkers 64 that have had modules loaded since the last begin command. The distant linker 66 resorts these BCTs removing any redundancies. The sorting and redundancy removal is accumulative and does not reorder any existing BCT definitions already posted via the BCT definitions command. This enables the system to continue to process while additional modules are added through program control.

The BCT definitions command 146 causes the local linkers 64 to post the BCT definitions it received from the distant linker 66. This BCT definitions command 146 is issued by the distant linker 66. The definitions contain the same information but in the sorted order of the distant linker 66. This gives each local linker 64 a consistent definition list.

The disclose function proposals command 148 is issued by the local linker 64 and causes the distant linker 66 to identify a unique set of disclose functions posted by the local linkers 64. Typically, there is one disclose function of a given name per distant program. By only allowing only one disclose function there is no ambiguity. The distant linker 66 assigns a unique identification number to each disclose function. This way all the participating processes in the system can uniquely identify the disclose function using the identification. This identification can also contain the distant process that will execute the function. Like the distant linker 66 the local linker 64 verifies that there are no duplicated disclose functions.

The exterior proposals command 150 issued to the distant linker 66 by a local linker 64 and causes the distant linker 66 to match these up with the disclose proposals or definitions depending on which command was received first by the distant linker 66. Exterior functions have the same name as their disclose partner. The exterior statement is a prototype where the disclose is the embodiment of the function. There can be many exterior statements within the system. The distant linker 66 verifies that each exterior statement of a given name has the same argument and results signatures as all the other exterior statements of the same name. The distant linker 66 verifies that the signature of disclose statements with matching exterior statements have the same signatures. If the verification is successful, the distant linker 66 assigns a unique identifier for each of the exterior statements. The unique identifier for the disclose and exterior statements of the same name will be the same. Also the local linker 64 prior to issuing the exterior proposals command will insure that all the local modules that have identified an exterior statement of a given name have the same argument and results signatures.

The disclose definitions command 152 causes the local linker 64 to post the unique identifier for each disclose regardless of whether or not the modules contained that disclose. The reason for this is that the system has to be able to handle a delegation through the use of a variable such as a function pointer, where the pointer is actually a unique identification number. The definition contains a unique identifier, the URL that contains the disclose. Any local linker 64 that has a matching exterior prototype will know where to direct any function calls to that exterior function. Also any local linker 64 who has both the exterior prototype and the disclose function call it directly without having to involve distant linking techniques.

The exterior function definitions command 154 causes the local linker 64 to post the unique identifier for each exterior prototype. This enables all the participating local linkers 64 to have a common identification for statements that can potentially link between distant modules.

Figure 8:
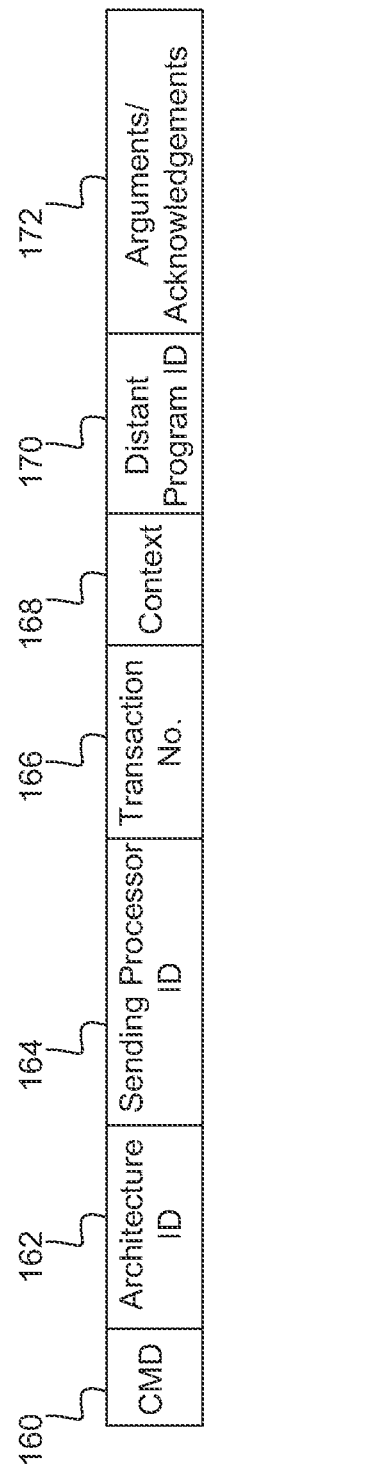
FIG. 8 is a table listing command information in accordance with exemplary embodiments.

With reference now to FIG. 8, in various embodiments, each of the commands 130-154 can include a set of common parameters, and one or more optional arguments. The common parameters can include, for example, but are not limited to, a command identification 160, an architecture identification 162, a processor identification 164, transaction number 166, a context 168, and a distant program identification 170.

The command identification 160 indicates the command that is to be performed. For example, the command identification can be a single byte long field and can store a number ranging from 1 to 127 and −1 to −127. Each number can represent a particular command as discussed above. The negative series of the number can indicate the acknowledgement of the receipt of the previously transmitted command. All positive commands receive an acknowledgement indicating that the receiver understood the command.

The architecture identification 162 identifies the type of data architecture that is transmitting the command. For example, the architecture identification can be a single byte that stores information identifying if the sender is a 32 bit or a 64 bit system, whether the sender is big endian or little endian, and/or how the sender packs data naturally. For example some machines require that a double word operand be on a double word boundary and other can be on a single word boundary. This byte could expand to be more than one byte it could also be series of bits that carries similar information.

The processor identification 164 identifies the processor number. For example, the distant linker 66 can be assigned to the processor identification number 0. The local linker 64 who initiated the program has a processor identification of 1. All other processors are assigned by the distant linker 66 as processors are added. Processors are added through either add module or load module commands.

When an add or load module command is issued to a local linker one of the optional arguments is the local linker's processor identification. When the local linker is started it assumes this processor identification. Local linkers can issue load or add module commands to the distant linker. The distant linker treats each load or add module command it receives as a request to start a new process on the identified machine. This causes the distant linker to contact the daemon on the identified machine and notify it to start a local linker and for it to load the identified module.

The transaction number 166 is an ever increasing number kept by all local linkers 64 and the distant linkers 66. The acknowledgements use the same transaction number the original command contained. New transaction numbers are obtained by the routine generating the command. Each command from a given linker will have the next higher number. The transaction numbers are only unique to a given local linker 64 or the distant linker 66.

The context identification 168 is an index into an array of contexts. Contexts include a structure that contains information about where this context is executing. The context structure contains enough information to enable the node that has the process and/or thread to do the work. This index system is kept synchronized by the distant linker 66 which issues context index and contact information. The initial program load is defined to be context zero.

The distant program identification 170 is the unique number that identifies the universe. All linking transactions will be accompanied by the distant program identification 170 to make sure the linking operations are performed on the correct program. There are several ways of generating unique distant program identifications. One such possibility is to have the distant linker 66 generate a new distant program identification when it is contacted that an initial program load has occurred. This approach will require an additional command not in the table above. Another approach is to have the local linker 64 that actually implements the initial program load generate the unique identification. This identification can be composed of the process identification on the local machine and the media access code (MAC) address. The advantage of the local linker 64 generating the distant program identification is that if the program does not generate a distant call the distant linker 66 does not have to get involved.

Figures 9, 10:
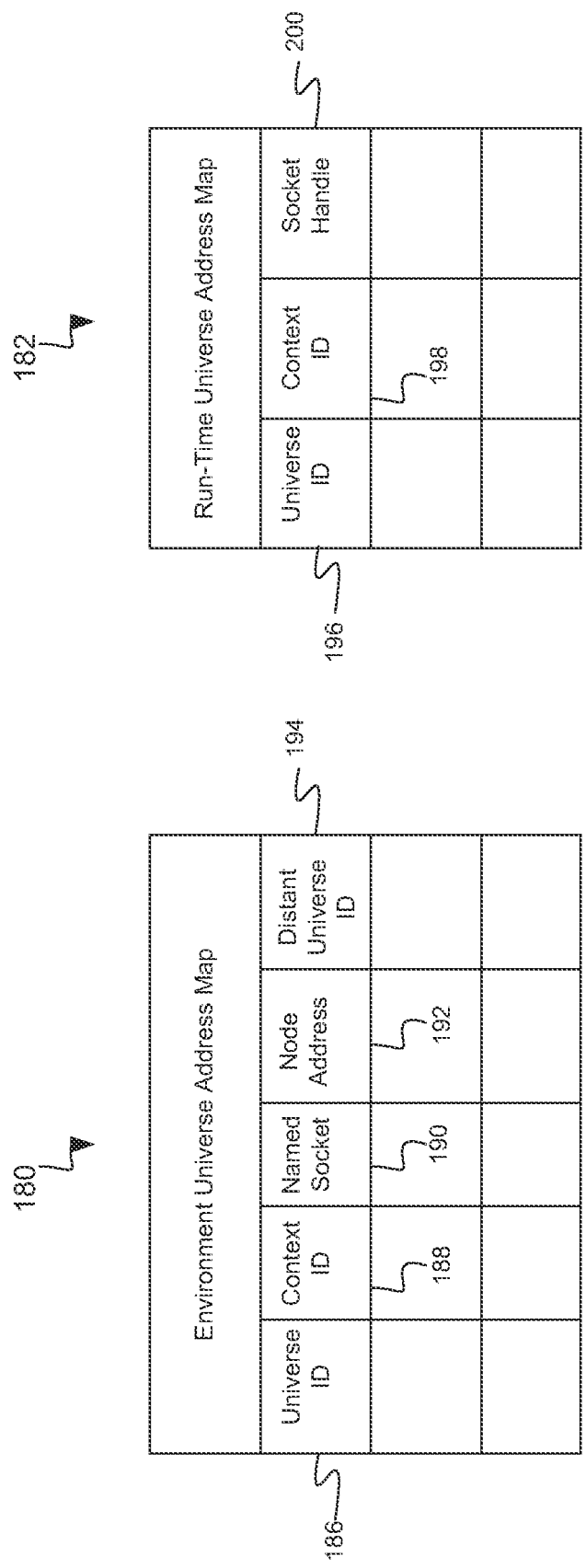

With reference now to FIGS. 9-11 and with continued reference to FIG. 2, the node environment 54 is described in accordance with various embodiments. As discussed above, the node environment 54 communicates using network sockets for communication between nodes 30*a*, 30*b* or named sockets 58 for communication between process 34 within the same node 30*a*. As can be appreciated, other possibilities of communications techniques within the node 30*a* can be implemented such as having the processes 34 in that node use shared memory.

The node environment 54 manages the architectural differences and address differences between the nodes by way of a one or more environment universe address maps 180, 184. The environment universe address map 180 includes data such as, but not limited to, a universe identification 186, a context identification 188, a named socket 190, a node address 192, and a distant universe identification 194.

In various embodiments, once the main routine has been loaded, the node environment 54 establishes a new universe 32 and begins to populate the environment universe address map 180. The universe identification 186 can be an integer based number that represents the universe 32 of which the set of modules are bound. The run-time environment 56 sends a message to the node environment 54 associated with the node 30*a*. The node environment 54 selects the next local universe identification 186, establishes the first context identification 188, and returns this information to the run-time environment 56 along with the named socket 190 to use for this context. The context identification 188 can be a combination of a system number, a space number, and a plane number. For example, the context identification 188 can be an integer value that is divided into bit ranges where a range is reserved for each component of the context identification 188.

The named socket 190 is converted to a socket handle and used for linker and delegation messages that pertain to the identified context.

The node address 192 is the web address for the node. The distant universe identification 194 is the universe identification that this universe has on the target node. Universes are established locally and mapped globally. During the linking process, as contexts are added to different nodes the distant linker updates the environments for each node with the universe address at each node. When communications are required between different contexts on different nodes the environments can translate the universe identification s between nodes.

Likewise, as shown in FIG. 10 the run-time environment 56 manages the architectural differences and address differences between the contexts by way of a run-time universe address map 182. For example, each row in the run-time universe address map 182 includes a universe identification 196, a context identification 198, and a socket handle 200. The universe identification 196 is used, for example, when interacting with the node environment 54. This allows the node environment 54 to quickly identify what universe is requesting an action. The combination of the context identification 198 and socket handle 200 allows a system or process to interact directly with other systems or processes within the same universe. For those contexts on the same node the socket handle 200 can allow the communication to go directly to that context's associated run-time.

When the context is on a different node the socket handle 200 can be one that the run-time environment 56 communicates with the node environment 54 of this local node. The local node environment will then repeat the request to the desired requestor over the network socket handle 200 to the environment handling the targeted context. The environment for the target context will repeat the command to the targeted context's run-time environment 56 over the associated socket handle 200 for that context.

As can be appreciated, there can be many different configurations of the table and/or message formats including those between environments. As shown in the table of FIG. 11, a message identification 202 can be used to track a number that allows the receiving node environment and context to acknowledge the receipt of the message. The message type 204 can be the operation requested. The distant universe 206 can be the corresponding universe identification within the receiving environment. The context identification 208 can be the context in which that the operation is addressed. The message 210 can include the details of the command to be processed by the receiving context or node environment.

To facilitate the connection between the nodes 30a, 30b, various commands can be established. For example, as shown in the command type 204 of FIG. 11, the commands can include a new distant universe command 212, a kill universe command 214, a link message command 216, a new local universe command 218, a new context command 220, a delegation command 222, and a unload context command 224. The new distant universe command 212 can request to another node to create a new context which may be a new system, space or plane. The context identification 208 is the context identification of the context to be created. From the context identification 208, the receiver can determine if module needs to be loaded. If so the message 210 includes necessary information.

The kill universe command 214 indicates that the system is terminating and the receiving environment should bring all contexts to a close. The link message command 216 is distant linker updating BCT related information to all the distant run-times. These are propagated to the systems within the universe. The actual linker command is carried in the message portion of this packet.

The new local universe command 218, is part of the initial program load that creates the first instance of the new universe. The new context command 220 identifies that a new context is created. If the node environment detects that other environments are associated with this universe, the node environment propagates this information to the other node environments so all node environments have the same context information. The delegation message command 222 is used to send a delegation request between systems on different nodes. The unload context command 224 lets the node environment update other node environments that either a system or space is about to be unloaded removing all subordinate contexts associated with them. This is propagated to all connected node environments so that the context tables for the system can be updated. As can be appreciated, to address security issues when the universe is spread over open networks, techniques such as SSL public and/or private keys and encryption can be utilized.

As can be appreciated, these commands and maps are provided typically at the daemon level due to the fact that there could be many universes created by starting multiple programs. These instructions and map are used for routing purposes so the daemon can route the linker commands from a specific universe to its correct context on the node associated with the daemon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method of linking a computer program across a mixed computing environment, comprising:
    identifying signatures of a plurality of elements of the computer program, wherein elements include one or more of: data types, their attributes and their order in data structures, data objects, and function arguments and results, the computer program comprising a plurality of modules, wherein each signature of elements is represented by a binary coded type that is generated by a compiler based on a unique naming convention using unique integers;

a linker that loads at a local processor a first subset of the modules of the computer program, wherein the loading comprises loading in a first set the binary coded types representing elements of the computer program corresponding to the first subset of modules; and linking, by a computer processor, the first subset of modules and a second subset of modules using a second set of binary coded types, wherein the second subset of modules are loaded at a distant processor and are distinct from the first subset of modules, and wherein the linking comprises:

transmitting to a distant linker the first set of signatures binary coded types representing the first subset of modules; and receiving from the distant linker a third set of binary coded types, comprising binary coded types representing both the first subset of modules and with the second subset of modules loaded at the distant processor, wherein the third set of binary coded types comprises at least a revised version of the first set of binary coded types.

2. The method of claim 1 wherein the linking comprises linking at least two modules of a same process.

3. The method of claim 1 wherein the linking comprises linking at least two modules of different processes on a same processor.

4. The method of claim 1 wherein the linking comprises loading at least two modules of different processes on different processors.

5. The method of claim 1 wherein the linking comprises loading at least two modules of different processors, wherein the different processors have different architectures.

6. The method of claim 1 further comprising identifying a function type of at least one element associated with a module in the first subset of modules, and wherein the linking the plurality of modules is further based on the function types and the binary coded types of the elements.

7. The method of claim 6 wherein the function type is at least one of an import type, an export type, an expose type, and an external type.

8. The method of claim 6 wherein the function type is at least one of an exterior type and a disclose type.

9. A computer program product for linking a computer program across a mixed computing environment, the computer program product comprising: a non-transitory storage medium readable by a processing circuit and storing instructions for execution by the processing circuit for performing a method comprising:

identifying signatures of a plurality of elements of the computer program, wherein elements include one or more of: data types, their attributes and their order in data structures, data objects, and function arguments and results, the computer program comprising a plurality of modules, wherein each of the signatures is based on a naming convention using unique integers, wherein each signature of elements is represented by a binary coded type that is generated by a compiler based on a unique naming convention using unique integers;

a linker that loads at a local processor a first subset of the modules of the computer program, wherein the loading comprises loading in a first set the binary coded types representing elements of the computer program corresponding to the first subset of modules; and linking, by a computer processor, the first subset of modules and a second subset of modules using a second set of binary coded types, wherein the second subset of modules are loaded at a distant processor and are distinct from the first subset of modules, and wherein the linking comprises:

transmitting to a distant linker the first set of binary coded types; and receiving from the distant linker the a third set of binary coded types, comprising binary coded types representing both the first subset of modules and with the second subset of modules loaded at the distant processor, wherein the third set of binary coded types comprises at least a revised version of the first set of binary coded types.

10. The computer program product of claim 9 wherein the linking comprises linking at least two modules of a same process.

11. The computer program product of claim 9 wherein the linking comprises linking at least two modules of different processes on a same processor.

12. The computer program product of claim 9 wherein the linking comprises loading at least two modules of different processes on different processors.

13. The computer program product of claim 9 wherein the linking comprises loading at least two modules of different processors, wherein the different processors have different architectures.

14. The computer program product of claim 9, the method further comprising identifying a function type of at least one element associated with a module in the first subset of modules, and wherein the linking the plurality of modules is further based on the function type and the binary coded types of the elements.

15. The computer program product of claim 14 wherein the function type is at least one of an import type, an export type, an expose type, and an external type.

16. The computer program product of claim 14 wherein the function type is at least one of an exterior type and a disclose type.

* * * * *